Dec. 18, 1951  J. H. HORNE  2,578,975
COMBINATION TAPPET WRENCH AND FEELER GAUGE
Filed Nov. 1, 1948
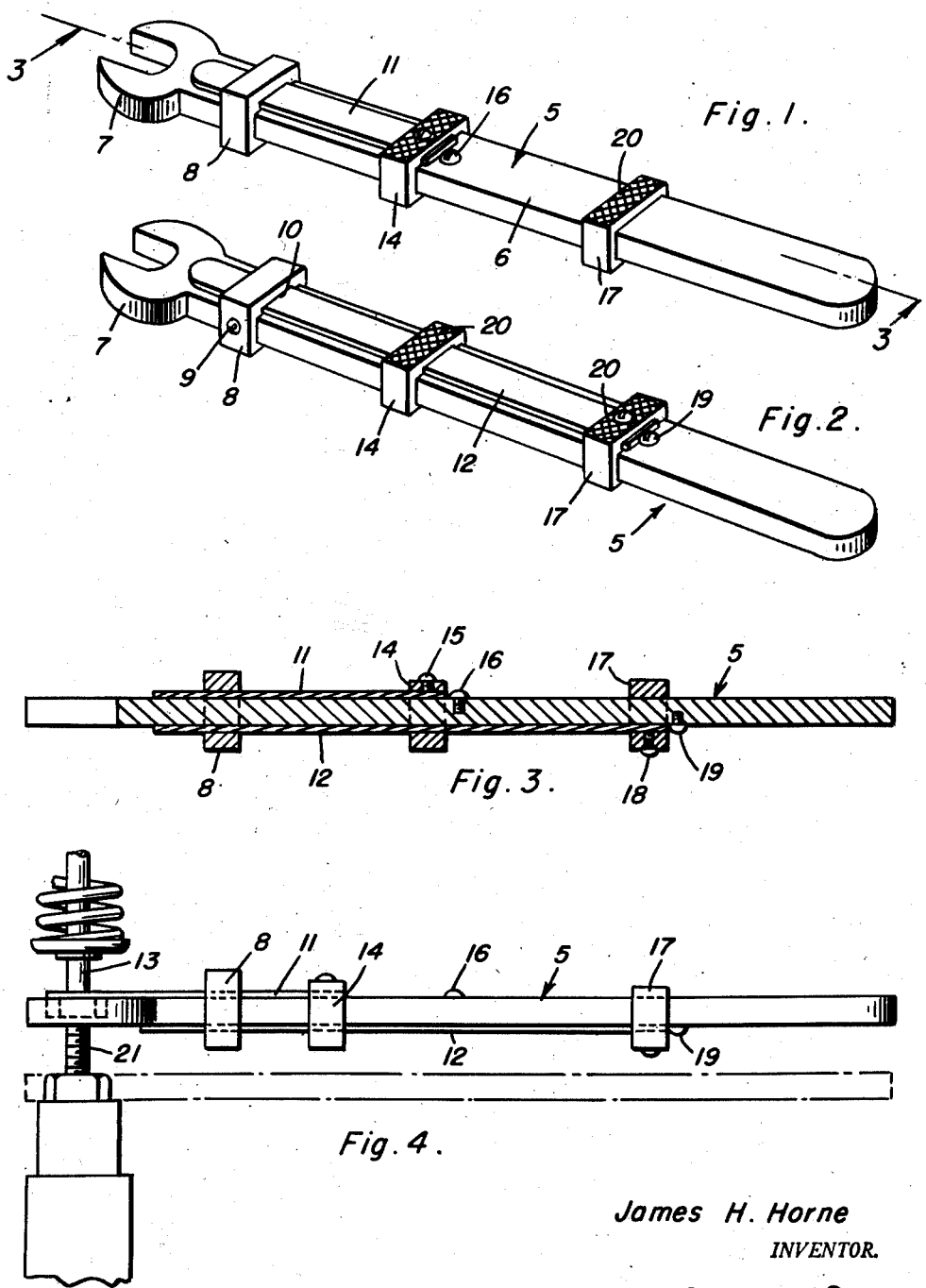
James H. Horne
INVENTOR.

Patented Dec. 18, 1951

2,578,975

UNITED STATES PATENT OFFICE 2,578,975

COMBINATION TAPPET WRENCH AND FEELER GAUGE

James H. Horne, Evans, Ga.

Application November 1, 1948, Serial No. 57,648

1 Claim. (Cl. 33—168)

The present invention relates to new and useful improvements in tappet wrenches and more particularly to a feeler gauge slidably carried by the wrench to determine the proper clearance for the valve of an internal combustion engine.

An important object of the invention is to provide a feeler gauge slidably carried at each side of a tappet wrench, the gauges being of various thicknesses for use with valves where different clearances are required.

A further object of the invention is to provide means for slidably mounting the feeler gauges on a tappet wrench without necessitating any changes or alterations in the construction of the wrench.

A still further object is to provide a tool of this character of simple and practical construction, which is sufficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the feeler gauge slidably carried at one side of a tappet wrench;

Figure 2 is a similar view showing a feeler gauge slidably carried at an opposite side of the wrench;

Figure 3 is a longitudinal sectional view taken on a line 3—3 of Figure 1; and

Figure 4 is a side elevational view.

Referring now to the drawing in detail wherein for the purpose of illustration I have disclosed a preferred embodiment of the invention the numeral 5 designates a tappet wrench of conventional construction which includes a handle 6 of rectangular shaped cross section and a jaw 7 at one end thereof.

A collar 8 is secured to the handle 6 by a set screw 9 in a position immediately rearwardly of the jaw 7, the collar having internal grooves 10 at its sides opposed to the upper and lower surfaces of the handle to form guides for a pair of feeler gauges 11 and 12 slidably positioned at opposite sides of the handle. The gauges 11 and 12 are of different thicknesses for use in setting a valve 13 at different clearances, and with the gauge 11 being shorter in length than the gauge 12 whereby the gauges may be identified by their differences in length.

A collar 14 is slidably mounted on the handle 6 and to which the rear end of gauge 11 is secured by a set screw 15 with a stop 16 in the form of a screw threaded into the adjacent side of the handle 6 to limit rearward movement of the gauge.

The rear end of gauge 14 is similarly secured to a collar 17 by means of a set screw 18, the collar 17 being likewise slidable on the handle and limited in its rearward movement by a stop 19 in the form of a screw threaded into the handle.

The outer surfaces of collars 14 and 17 are knurled as shown at 20 and the heads of the set screws 15 and 18 project outwardly beyond the surfaces of the collars to facilitate sliding of the collars by the thumb of a mechanic gripping the wrench.

In the use of the tool the wrench 5 is used to adjust the valve tappet 21 and the clearance between the valve and tappet is determined by selecting one of the feeler gauges 11 and 12 as determined by the position of their respective collars 14 and 17 on the handle of the wrench and sliding the collar forwardly to project the gauge into a position overlying the jaw 7, as shown in Figure 4 of the drawing to thus check the clearance of the valve.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A tool comprising a handle, feeler gauges slidably carried at opposite sides of the handle, a guide fixed to the handle in guiding position for both of said gauges said gauges being of different lengths to indicate a difference in the size thereof, and a pair of slides embracing the handle at different longitudinal positions thereof and connected to the respective gauges to designate a related gauge.

JAMES H. HORNE.

REFERENCES CITED

The following references are of record in the file of this patent:

UNITED STATES PATENTS

| Number | Name | Date |
| --- | --- | --- |
| 160,543 | Patterson | Mar. 9, 1875 |
| 224,401 | Derickson | Feb. 10, 1880 |
| 493,963 | Bolinger | Mar. 21, 1893 |
| 1,696,019 | Sievern | Dec. 18, 1928 |
| 2,184,340 | Ferlin | Dec. 26, 1939 |
| 2,313,174 | Shock | Mar. 9, 1943 |